(12) United States Patent
Birkelund

(10) Patent No.: US 6,293,513 B1
(45) Date of Patent: Sep. 25, 2001

(54) SERVO-CONTROLLED MAGNETIC VALVE

(75) Inventor: Michael Birkelund, Middelfart (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 09/581,499

(22) PCT Filed: Dec. 8, 1998

(86) PCT No.: PCT/DK98/00532

§ 371 Date: Jun. 14, 2000

§ 102(e) Date: Jun. 14, 2000

(87) PCT Pub. No.: WO99/34138

PCT Pub. Date: Jul. 8, 1999

(30) Foreign Application Priority Data

Dec. 23, 1997 (DE) .............................. 197 57 475

(51) Int. Cl.[7] .................................................... F16K 31/06

(52) U.S. Cl. .......................................... 251/30.03; 251/77

(58) Field of Search .................... 251/30.03, 58, 251/77

(56) References Cited

U.S. PATENT DOCUMENTS 2,666,451 * 1/1954 Ray ................................... 251/30.03

* cited by examiner

Primary Examiner—John Fox
(74) Attorney, Agent, or Firm—Lee, Mann, Smith, McWilliams, Sweeney and Ohlson

(57) ABSTRACT

A servo-controlled magnetic valve has a main valve (13) and a servo valve (14). The servo valve opens when, after an empty stroke, a solenoid plunger (7) entrains a slide member (23) that carries the servo closure member (20) and, as a result, pressure is released to the low pressure side (17) from a pressure chamber (25) on the side of the servo piston (24) that is remote from the main valve seat (15). The servo piston (24) is an annular piston that surrounds an insert (19) that carries the main valve closure member (18) and the servo valve seat (20) and which, during the operating stroke, entrains the slide member (23) by means of first stops (26) and the insert (19) by means of second stops (28). In that manner, it is possible to obtain sufficient opening of the main valve (13) and a small overall height of the magnetic valve while retaining an initial empty stroke of the solenoid plunger (7).

10 Claims, 2 Drawing Sheets

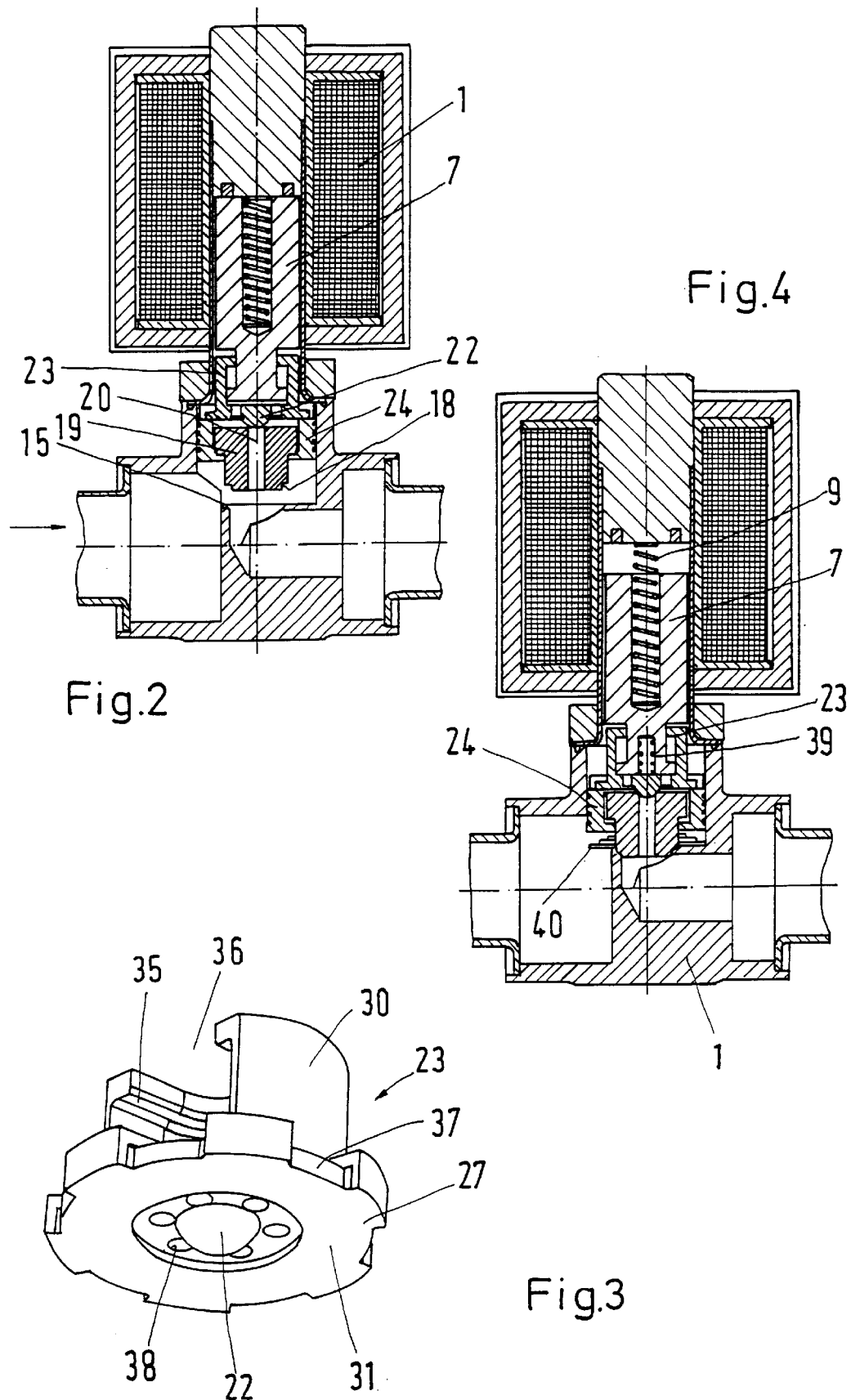

SERVO-CONTROLLED MAGNETIC VALVE

The invention relates to a servo-controlled magnetic valve having a main valve, the main closure member of which can be raised from the main valve seat, which is fixed relative to the housing, by the operating stroke of a servo piston, and having a servo valve, the servo closure member of which can be raised from the servo valve seat when, after an empty stroke, a solenoid plunger entrains a slide member that carries the servo closure member and, as a result, pressure is released to the low pressure side from a pressure chamber on the side of the servo piston that is remote from the main valve seat.

In a known magnetic valve of that type, the slide member consists of a rod that carries the servo closure member at one end and a stop at the other end and, between them, carries a second stop. Arranged between the two stops is the solenoid plunger having corresponding counter-stops. During a first section of the operating stroke of the solenoid plunger, the plunger is accelerated without load so that, after an empty stroke, it comes into contact with the slide member with considerable energy. Since, simultaneously, the magnetic force has also increased, relatively small electromagnetic systems are sufficient to actuate the magnetic valve. After the empty stroke there follows a second section of the operating stroke in which the slide member is removed from the region of the main valve seat so that the main closure member, which is provided, together with the servo valve seat, at the base of a pot-shaped servo piston, can open wide enough. This results in a relatively large operating stroke of the solenoid plunger and thus a large overall height of the magnetic valve.

The problem underlying the invention is to provide a magnetic valve that, under conditions that are otherwise the same, makes possible a relatively small overall height combined with a relatively large opening stroke of the main valve.

The problem is solved according to the invention in that the servo piston is an annular piston that surrounds an insert that carries the main valve closure member and the servo valve seat and which, during the operating stroke, entrains the slide member by means of first stops and the insert by means of second stops.

In that construction, after the solenoid plunger has executed the empty stroke, the slide member is no longer drawn outwards by the solenoid plunger, but is pushed outwards by the servo piston, the slide member carrying out a stroke relative to the solenoid plunger in the opposite direction to the empty stroke. Since the slide member does not need to project out of the free end of the solenoid plunger, the desired small overall height is possible.

During its operating stroke, the servo piston also entrains the insert that carries the main closure member, resulting in a large opening of the main valve. The entrainment of the insert, which is delayed relative to the slide member, ensures that the servo valve remains open during the opening stroke of the main closure member and thus the opening action is not interrupted. The empty stroke path of the solenoid plunger, the second stop and a step on the insert are so adapted to one another that the servo valve cannot close. Overall, a relatively large degree of valve opening can be obtained with a very low differential pressure for opening.

It is recommended that the first stops be formed by the annular end face of the servo piston and co-operate with stop faces of the slide member that project radially beyond the insert, and/or that the second stops be formed by an inner flange of the servo piston and co-operate with an outer step on the insert. Such constructions can be manufactured very easily.

In a preferred embodiment, the slide member is generally in the shape of a pot having a base plate and a pot wall, the adjacent end of the plunger piston engages inside the pot and relative movement is limited by stops on the pot and on the plunger piston to the size of the empty stroke. This results in coupling between the slide member and plunger piston that lends itself to the short overall height.

It is advantageous for the base plate to carry the servo closure member in its centre and to project outwards beyond the diameter of the pot. The projecting portion forms the desired stop faces without the diameter of the pot having to be substantially larger than the diameter of the solenoid plunger.

It is also advantageous for the pot wall to have a cut-away portion, through which the solenoid plunger can be inserted transversely to the stroke direction. In that manner, assembly can be simplified substantially.

It is advantageous for the base plate to have notches at its edge and/or holes that are located further in. In that manner, channels are produced through which fluid can, during movement of the slide member, pass without a large throttling action, so that the movement of the slide member is not hindered. This ensures that the fluid in the pressure chamber can flow out of the slide member when the valve is fully opened, which would not otherwise be able to take place because of the position of the servo piston resting against the slide member.

It is recommended that the operating stroke of the solenoid plunger be only slightly larger than the empty stroke. An extremely small overall height is thus obtained.

Preferably, in addition to a closing spring that acts upon the solenoid plunger, a relatively weak pressure spring is provided between the slide member and the solenoid plunger. That pressure spring prevents the solenoid plunger from "sticking" to the slide member and hence stops the servo valve from opening before the empty stroke has been completed.

Moreover, in addition to a closing spring that acts upon the solenoid plunger, it is advantageous for a relatively weak pressure spring that acts in the direction of the operating stroke to be provided between the housing and the servo piston. That pressure spring ensures that the servo piston starts its operating stroke as soon as the servo valve is open. In the limit, the differential pressure for opening can be reduced to zero.

The invention is described hereinafter in greater detail with reference to preferred embodiments shown in the drawings, in which:

FIG. 2 shows the magnetic valve of FIG. 1 in the open state;

FIG. 3 is a perspective view of a slide member that can be used according to the invention; and FIG. 4 is a modified construction.

Figure 1:
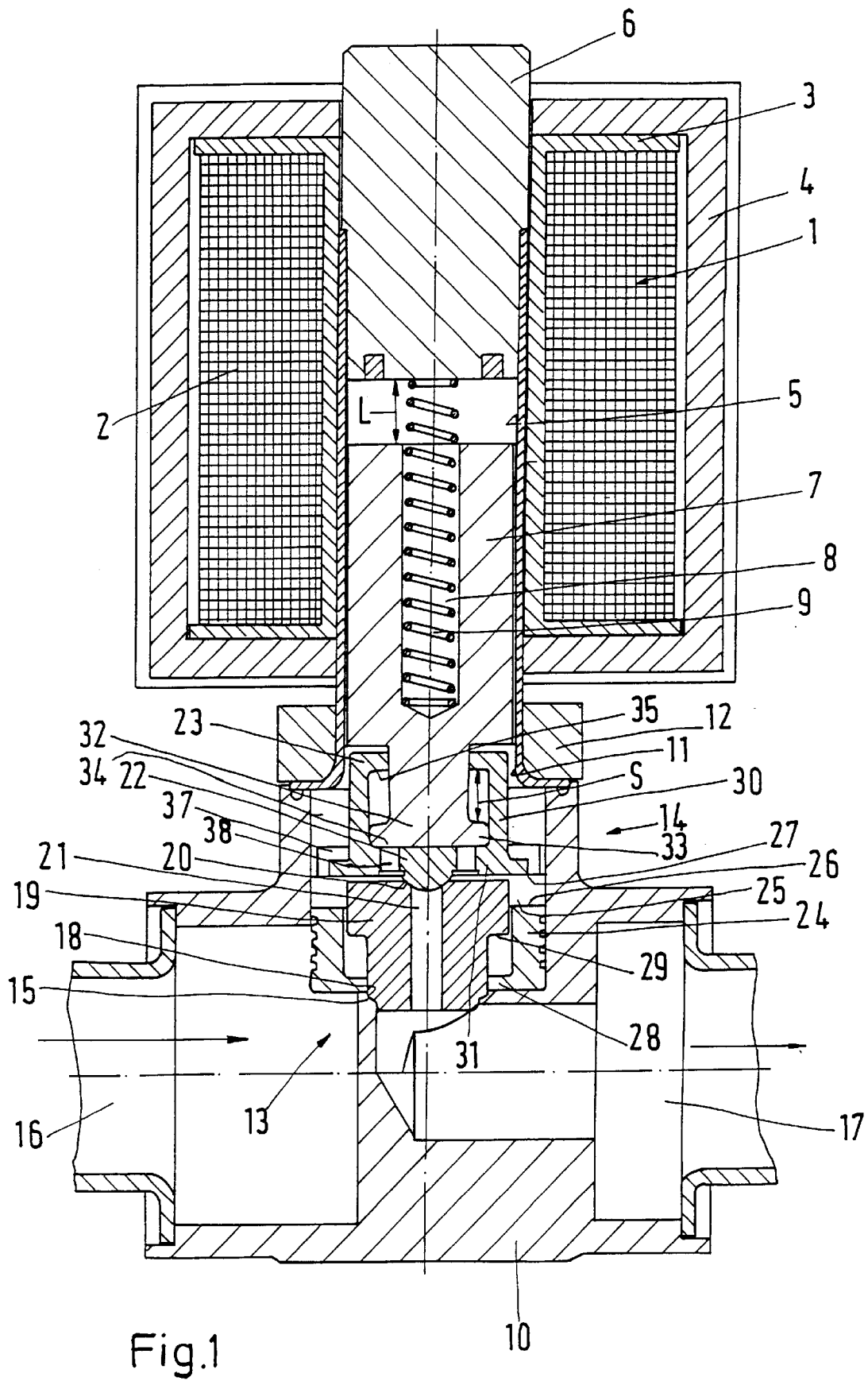
FIG. 1 is a section through a magnetic valve according to the invention in the closed state.

The magnetic valve shown has an electromagnet 1 having a coil 2 which is wound on a coil former 3 and is surrounded by a yoke 4. A tubular armature 5, into the outer end of which there is introduced a plug 6 made of a magnetically conducting material, is held by the coil former 3. Also provided in the tubular armature 5 is a solenoid plunger 7 which is acted upon by a closing spring 9 that is received in a blind bore 8. The electromagnet 1 is connected fixedly to a valve housing 10 by way of the tubular armature 5. For that purpose, the tubular armature 5 has at its lower end a radially angled collar 11 which is held in place on the valve housing 10 by means of a flange-like clamping piece 12, for example, by screws.

Located in the valve housing 10 are a main valve 13 and a servo valve 14. The main valve 13 has a main valve seat 15, which is fixed relative to the housing and which is arranged between the inlet-side pressure side 16 and the outlet-side low pressure side 17, and a main closure member 18 which is provided on the underside of an insert 19. The servo valve 14 has a servo valve seat 20 which is located on the upper side of the insert 19 and which forms the inlet to a channel 21 that leads to the low pressure side 17, and a servo closure member 22 which is provided on the underside of a slide member 23.

The insert 19 is surrounded by a servo piston 24, which, on its end face that is remote from the main valve seat 15, bounds a pressure chamber 25 which, when the main and servo valves are shut, carries the inlet-side pressure by virtue of leakage channels and, when the servo valve 14 is opened, carries the outlet-side low pressure. On its upper end face, the servo piston 24 has first stops 26 which co-operate with stop faces 27 on the underside of the slide member 23 and, on an inner flange of the servo piston 24, second stops 28 which co-operate with an outer step 29 on the insert 19. The distance between the first stops 26 and the associated stop faces 27 is smaller than the distance between the second stop faces 28 and the associated step 29. This means that, when the servo piston 24 is moved, first the slide member 23 and then the insert 19 are entrained, the entrainment movement accordingly taking place when the servo valve 14 is open. The ratio of the diameters of the servo piston 24 and the insert 19 is so selected that the main valve can open and is typically approximately 2:1.

The slide member 23 has a substantially smaller axial length than the solenoid plunger 7. It is substantially in the shape of a pot having a pot wall 30 and a base plate 31. The diameter of the pot is slightly smaller than the diameter of the solenoid plunger 7. The base plate 31 projects beyond the diameter of the pot in order to form the stop faces 27. An armature foot 32 projects inside the pot and, at the lower end, has a double stop 33 which, in one end position, co-operates with a stop 34 that is formed by the upper side of the base plate 31 and, in the other end position, co-operates with a stop 35 that is formed by an inner flange of the slide member 23. The slide member 23 and the solenoid plunger 7 can thus be moved relative to one another in an empty stroke S. That empty stroke S is slightly smaller than the operating stroke L that can be covered by the solenoid plunger 7.

Further details of the slide member 23 can be found in FIG. 3. The pot wall 30 has an opening 36 so that the armature foot 32 can be inserted inside the pot transversely to the stroke direction, despite the presence of the double stop 33. The base plate 31 also has notches 37 on the outside and, located further in, holes 38 which enable fluid to pass unthrottled from the underside to the upper side of the base plate 31 and vice versa, which means that the operation of the magnetic valve is not hindered by throttle resistances.

The magnetic valve operates as follows:

1. When the main valve 13 is closed (FIG. 1) and the electromagnetic valve 1 is excited, the solenoid plunger 7 executes its operating stroke L. In so doing, the double stop 33, after a no-load empty stroke S, comes into contact with the stop 35 of the slide member 23 and entrains the latter for a short distance. As a result, the servo valve 14 opens and pressure is released from the pressure chamber 25 to the low pressure side 17 via the channel 21. The force exerted on the servo piston 24 from below by the fluid pressure then prevails so that the servo piston 24 is displaced upwards and in so doing entrains first the slide member 23 by means of its first stops 26 and then the insert 19 by means of its second stops 28. This means that, with the servo valve 14 remaining open, the slide member is pushed upwards in a stroke corresponding to the empty stroke S. The insert 19 also carries out that movement so that the main valve 13 is opened and the cross-section of the opening is large. That state, shown in FIG. 2, is maintained as long as the electromagnet is excited.

2. When the exciting current is interrupted, the closing spring 9 ensures that the solenoid plunger 7 is pushed downwards, so that, following a short movement, the armature comes to rest on the base of the slide member 23 and closes the holes 38. Because the double stop 33 is resting against the stop 34, the armature entrains the slide member 23, as a result of which the servo valve 14 closes. The inlet-side pressure builds up again in the pressure chamber 25 via leakage channels, as a result of which the servo piston 24 and the insert 19 return to the resting position shown. The main valve 13 closes at first slowly and then more and more rapidly until the position in FIG. 1 has been reached. When the insert 19 comes to rest against the main valve seat 15, the main valve remains closed but the servo valve is still open until the further movement of the slide member finally causes the servo closure member 22 to come to rest against the servo valve seat 20.

The construction of FIG. 4 corresponds to that of FIGS. 1 to 3, except that two springs are present in addition to the closing spring 9. These are: a first pressure spring 39, which is weaker than the closing spring 9 and is connected between the solenoid plunger 7 and the slide member 23 and ensures that there is reliable separation from the slide member 23 at the start of the empty stroke of the solenoid plunger 7; and a second pressure spring 40, which is weaker than the closing spring 9 and is arranged between the valve housing 1 and the servo piston 24. That spring is able to raise the servo piston 24 until it rests against the insert 19 and ensures that even small pressure differentials are sufficient to make the servo piston 24 move and thus to open the main valve 13. Moreover, with suitable dimensioning, it is also possible to obtain a braked closing movement with that pressure spring 40.

It is possible to diverge from the embodiments shown, in many respects, without departing from the basic concept of the invention. For example, instead of engaging over the armature foot 32, it is also possible for the slide member to engage, by means of a central continuation piece, in a corresponding opening of the solenoid plunger 7. The movement of the solenoid plunger 7 is favourably influenced if the upper and lower end faces are connected to one another, for example by an extension of the blind bore 8 by a bore of relatively small diameter.

What is claimed is:

1. Servo-controlled magnetic valve having a main valve with a main closure member which can be raised from a main valve seat by an operating stroke of a servo piston, the main valve seat being fixed relative to the housing, and having a servo valve with a servo closure member which can be raised from the servo valve seat when, after an empty stroke, a solenoid plunger entrains a slide member that carries the servo closure member and, as a result, releases pressure to a low pressure side from a pressure chamber on a side of the servo piston that is remote from the main valve seat, the servo piston being an annular piston that surrounds an insert that carries the main valve closure member and the servo valve seat and which, during the operating stroke, entrains the slide member by means of first stops and the insert by means of second stops.

2. Magnetic valve according to claim 1, in which the first stops are formed by an annular end face of the servo piston and co-operate with stop faces of the slide member that project radially beyond the insert.

3. Magnetic valve according to claim 1, in which the second stops are formed by an inner flange of the servo piston and co-operate with an outer step on the insert.

4. Magnetic valve according to claims 1, in which the slide member is generally in the shape of a pot having a base plate and a pot wall, an adjacent end of the plunger piston being engaged inside the pot and relative movement being limited by stops on the pot and on the plunger piston to an empty stroke.

5. Magnetic valve according to claim 4, in which the servo closure member is located at a center of the base plate and projects outwards beyond the pot.

6. Magnetic valve according to claim 4, in which the pot wall has a cut-away portion through which the solenoid plunger can be inserted transversely to stroke direction.

7. Magnetic valve according to claim 4, in which the base plate has at least one of notches at its edge and holes located further in from the edge.

8. Magnetic valve according to claim 1, in which the solenoid plunger has an operating stroke which is only slightly larger than the empty stroke.

9. Magnetic valve according to claim 1, in which, in addition to a closing spring that acts upon the solenoid plunger, a relatively weak pressure spring is provided between the slide member and the solenoid plunger.

10. Magnetic valve according to of claim 1, in which, in addition to a closing spring that acts upon the solenoid plunger, a relatively weak pressure spring that acts in the direction of the operating stroke is provided between the housing and the servo piston.

* * * * *